United States Patent
Andersson et al.

(10) Patent No.: US 7,500,695 B2
(45) Date of Patent: Mar. 10, 2009

(54) SHOCK-ABSORBING OCCUPANT PROTECTION

(75) Inventors: Bjorn Andersson, Onsala (SE); Glenn Johansson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/160,346

(22) Filed: Jun. 20, 2005

(65) Prior Publication Data

US 2005/0230951 A1    Oct. 20, 2005

Related U.S. Application Data

(63) Continuation of application No. PCT/SE2003/001948, filed on Dec. 15, 2003, now abandoned.

(30) Foreign Application Priority Data

Dec. 20, 2002   (SE) ................................. 0203800

(51) Int. Cl.
*B60R 21/04* (2006.01)
(52) U.S. Cl. .................. 280/752; 280/748; 280/751; 296/187.05
(58) Field of Classification Search ............ 296/187.03, 296/187.05, 187.06; 280/728.1, 732, 748, 280/751, 752, 753, 727; 297/216.1, 216.12, 297/216.13, 216.14
See application file for complete search history.

(56) References Cited

U.S. PATENT DOCUMENTS

| | | | |
|---|---|---|---|
| 3,130,807 A * | 4/1964 | McHenry | 180/90 |
| 3,370,886 A | 2/1968 | Frost | |
| 3,603,535 A * | 9/1971 | DePolo | 244/121 |
| 3,614,129 A | 10/1971 | Sobkow | |
| 3,650,223 A * | 3/1972 | Kobori | 108/44 |
| 5,141,279 A * | 8/1992 | Weller | 296/146.7 |
| 5,427,331 A * | 6/1995 | Stroud | 244/122 AG |
| 5,902,010 A * | 5/1999 | Cuevas | 297/216.13 |
| 5,967,594 A | 10/1999 | Ramanujam | |
| 6,203,105 B1 * | 3/2001 | Rhodes, Jr. | 297/284.6 |
| 6,390,549 B1 * | 5/2002 | Mayer et al. | 297/216.14 |
| 2002/0021033 A1 * | 2/2002 | Bayer et al. | 297/216.12 |

FOREIGN PATENT DOCUMENTS

| | | |
|---|---|---|
| DE | 836748 C | 4/1952 |
| DE | 4441777 A1 | 5/1996 |
| DE | 19647690 C1 | 4/1998 |
| WO | 9616837 A3 | 6/1996 |

OTHER PUBLICATIONS

International Search Report for International Patent Application PCT/SE2003/001948, dated Feb. 24, 2004.

* cited by examiner

*Primary Examiner*—Ruth Ilan
(74) *Attorney, Agent, or Firm*—Novak Druce + Quigg, LLP

(57) ABSTRACT

Shock-absorbing occupant protection (8) for the passenger compartment of a vehicle (1) comprising a container (9) of flexible design which is gas-filled in an original expanded rest position and is designed to be compressed when absorbing energy under impact by a passenger.

16 Claims, 4 Drawing Sheets

OK TO ENTER: /R.I./

SHOCK-ABSORBING OCCUPANT PROTECTION

CROSS-REFERENCE TO RELATED APPLICATION

The present application is a continuation patent application of International Application No. PCT/SE2003/01948 filed 15 Dec. 2003 which was published in English pursuant to Article 21(2) of the Patent Cooperation Treaty, and which claims priority to Swedish Application No. 0203800-8 filed 20 Dec. 2002. Said applications are expressly incorporated herein by reference in their entireties.

TECHNICAL FIELD

The present invention relates to a shock-absorbing occupant protection for the passenger compartment of a vehicle. Shock-absorbing occupant protection is used in order to reduce the risk of injury to occupants of a vehicle in the event of a collision. The risk of injury is reduced by allowing a gas-filled container to be compressed by the impact of the occupant. The type of shock-absorbing device referred to is pressurized in its rest position, in contrast to conventional airbags which are pressurized when a collision is detected. A pressurization of the shock-absorbing device according to the invention does not cause any damage to the vehicle or its inner panel in which the container is fitted.

BACKGROUND OF THE INVENTION

In order to enhance the safety of occupants of a vehicle, shock-absorbing devices in the form of airbags are, where appropriate, used to reduce the risk of injury on impact. Airbags are pressurized when a collision is detected. In a collision, the occupant will be thrown against the airbag, which is compressed by the impact so that the occupant is gently cushioned by the airbag. After pressurization and compression, the airbag cannot be activated again. This means that conventional airbags are not a suitable choice for protecting the occupants of heavy vehicles such as trucks, for example.

Usual collision sequences involving passenger cars comprise a rapid deceleration of the passenger car so that the occupant is thrown into the airbag. Following this deceleration, the vehicle will usually have been brought to a standstill. A collision sequence involving a heavy vehicle is of an essentially different character to a collision sequence involving a passenger car. This is due to the fact that the motion of the heavy vehicle usually cannot be immediately absorbed by an initial collision but continues to move at somewhat reduced speed following the initial collision. A usual collision sequence involving a heavy vehicle may continue for approximately 10 to 15 seconds. This means that an occupant of a heavy vehicle risks being thrown against the shock-absorbing device a number of times in the course of a collision. Using airbags of known design that are activated and inflated in a collision, a protective function is only provided for the first impact of the sequence. Furthermore, in the pressurization of the airbag, the bag often penetrates the internal lining panel of the vehicle. This can give rise to sharp edges against which the occupant may be thrown at a later stage in the collision sequence.

DE 1 96 47 690 discloses a shock-absorbing device that is designed to be fitted in an enclosed space. The device comprises an outer panel and a gas-filled bag which is fitted to the outer panel. The gas-filled bag is filled after fitting, thereby providing a cushioning assembly. Since the shock-absorbing device is filled in its rest position, there is no risk of the panel being penetrated by pressurization of the flexible container. Since the gas-filled bag is formed from non-rigid material, the container will not assume its original shape after an initial impact. This makes the device unsuitable for multiple impacts during a collision sequence.

SUMMARY OF THE INVENTION

An object of the invention is to provide an occupant protection arrangement (also more simply referred to as merely an occupant protection) for multiple impacts by an occupant during a collision sequence involving a vehicle. This object is achieved by a shock-absorbing device serving as an occupant protection (8) and which comprises means (13) for returning the container (9) to an original expanded rest position following compression of the container. The shock-absorbing device according to the invention comprises a container of flexible design which is gas-filled in an original expanded rest position and is configured to be compressed when absorbing energy under impact by a passenger. The fact that the container is gas-filled in its original rest position means that no penetration of the internal lining panel of the vehicle occurs upon activation. The container is preferably activated by starting of the vehicle.

A shock-absorbing device configured according to the invention comprises means for returning the container to its original expanded rest position following compression of the container. This means that following an initial collision, the container is returned to an active protecting position in which energy can again be absorbed by the container.

In a preferred embodiment, the means of returning the container to the original, expanded rest position comprises a pressurized tank, which is connected to the flexible container by a valve element, which delivers a working pressure for the flexible container. In an initial impact, the container is deformed while being partially or entirely emptied of its contents via an outlet valve. When the occupant has ceased to compress the container in the initial impact, the gas will be topped up from the pressurized tank thereby enabling the container to recover, or partially recover its original shape before the next impact occurs.

According to a further preferred embodiment of the invention, the device comprises a control unit, which is designed, by way of an air inlet valve, to regulate the working pressure as a function of the amount of energy the container must absorb. The working pressure is preferably controlled according to the speed of the vehicle and the weight of the occupant. This means that the flexible container can be made rigid enough to prevent penetration by the occupant and that the container can be made as flexible as possible with regard to the available deformation distance.

According to a preferred embodiment of the invention, the working pressure of the container is an excess pressure. If normal air pressure is used, no restoring force is obtained after the container has been emptied or partially emptied of its contents. It is furthermore inadvisable to use an excessively high pressure since highly pressurized containers can explode. Furthermore, a high working pressure means that it takes longer to fill the container from a pressurized tank at a given pressure.

According to a preferred embodiment of the invention, the working pressure ranges between 1.05 and 3 bars over atmospheric pressure, and preferably between 1.6 and 2 bars over atmospheric pressure.

The application also relates to a vehicle that comprises a compressed air supply system. According to this embodiment, the pressurized tank which supplies the flexible container is coupled to the existing compressed air supply system of the vehicle.

BRIEF DESCRIPTION OF DRAWINGS

The invention will be described in more detail below with reference to the accompanying drawings, and in which.

DETAILED DESCRIPTION

Figure 1:
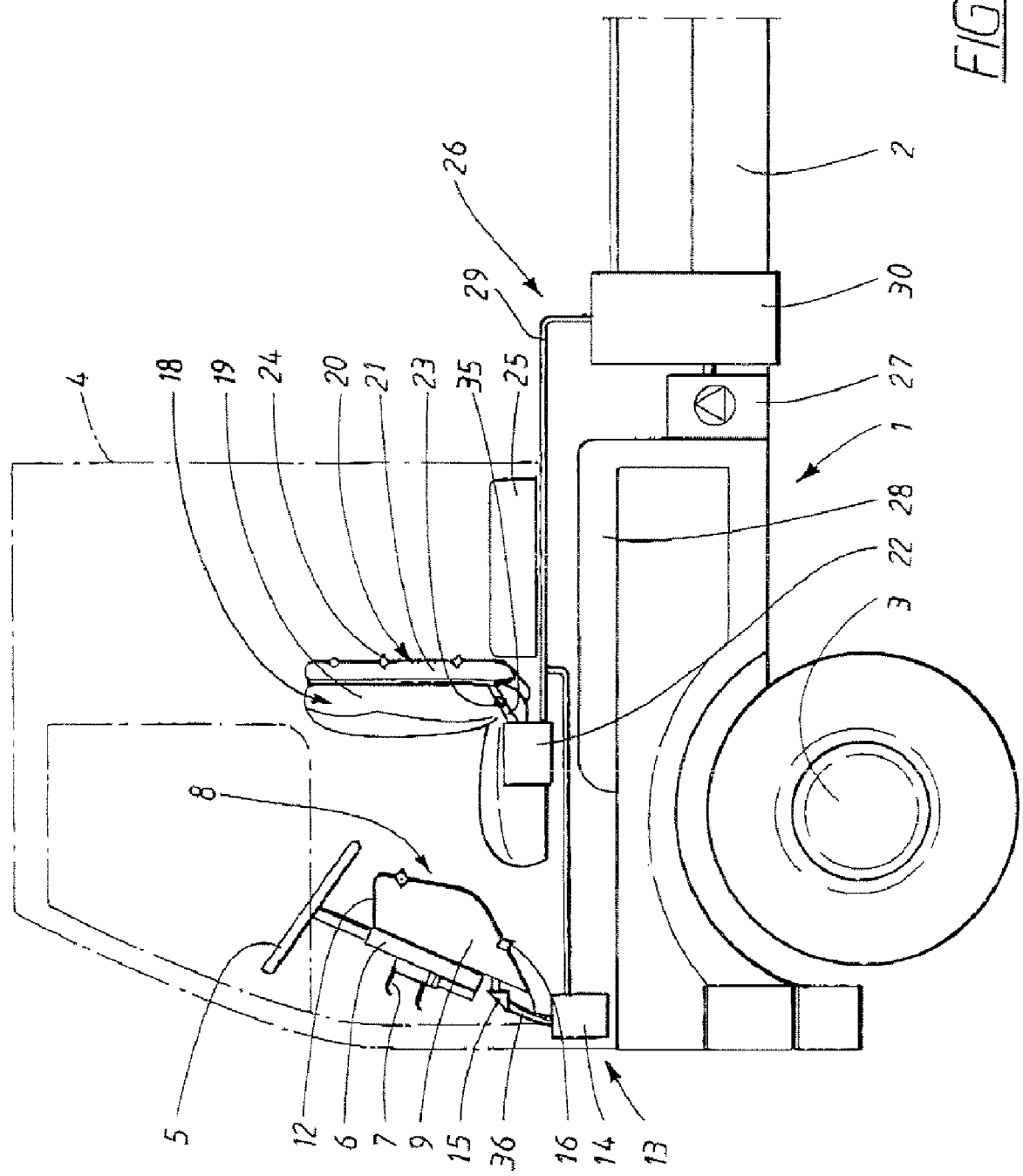
FIG. 1 is a schematic view of a vehicle in which a shock-absorbing device configured according to the present invention is used.

FIG. 1 shows a vehicle 1 that is constructed on a load-bearing frame 2 in which wheel axles 3 are suspended in a conventional way. The frame also supports a driver's cab 4. The vehicle, as shown, takes the form of a heavy truck. The invention can be used on vehicles of all types, but is most advantageous on heavy vehicles used in road transport, such as the tractor vehicle to a trailer. A steering wheel 5 is fitted in the driver's cab 4. The steering wheel 5 is supported in the usual manner by a steering column 6 which is securely mounted in the vehicle by means of a bracket 7. The invention can also be used on vehicles in which steering is performed electronically, the lock applied to the steering wheel being registered by a sensor which then undertakes control of the vehicle by way of actuators controlled by the sensor. In such a case the steering wheel may be supported in a weaker structure than steering columns commonly encountered at present.

A shock-absorbing occupant protection 8 configured according to the invention is fitted behind the steering column 6 in the vehicle direction of travel. The shock-absorbing device 8 comprises a container 9 of flexible design which is gas-filled in an original expanded rest position. The parts of the container 9 that are visible from the inside of the cab, which corresponds to an impact surface for the container, are preferably covered by a panel material 10 selected for the cab. On the impact surface, the panel material 10, together with the wall 11 of the container, are preferably designed to distribute the force over the surface of the container. For this purpose the panel material or the parts of the container wall bearing against the impact surface may be made from a relatively rigid plastic or composite material. The container 9 has at least one flexible wall 12 that is designed to be deformed on impact so that the container is compressed. In a preferred embodiment, the volume of the container is reduced under deformation so that the pressure in the container increases. The flexible wall 12 may be made substantially thinner than the wall of the container on the impact surface.

Figure 3:
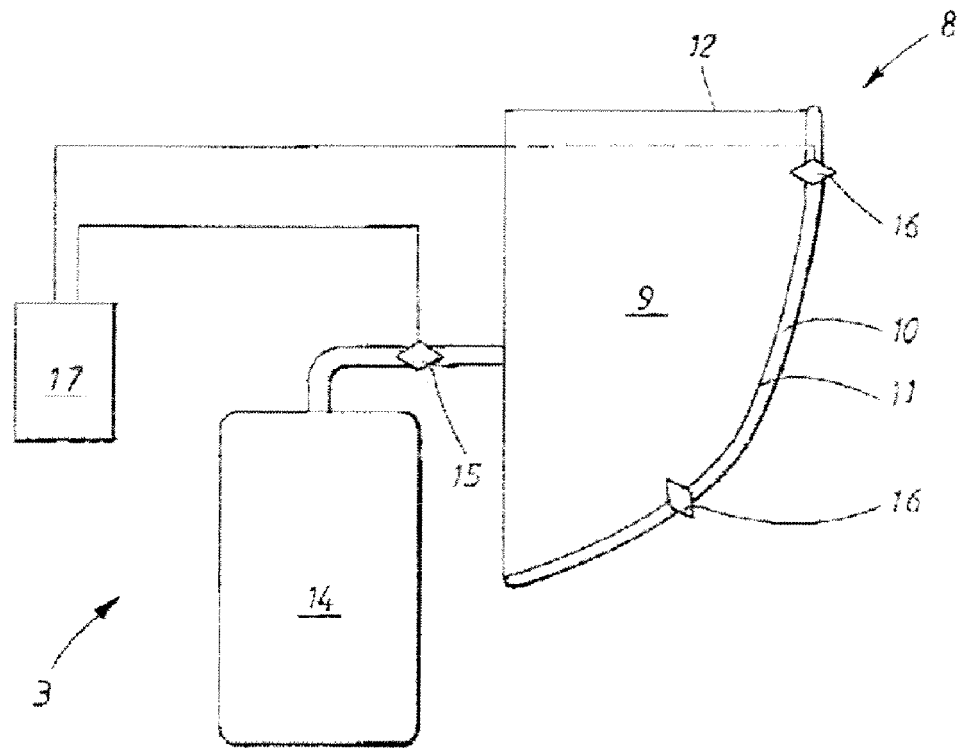
FIG. 3 is a diagrammatic view showing in greater detail a shock-absorbing device configured according to the teachings of the present invention.

According to the invention, the shock-absorbing device 8 has means 13 of returning the container to the original expanded rest position following compression of the container. In the preferred embodiment shown in FIGS. 1 and 3, these means 13 comprise a pressurized tank 14, which by way of an air inlet valve 15 is designed to deliver a working pressure of the flexible container 9. According to a preferred embodiment of the invention, the container 9 furthermore has one or more outlet valves 16. Should an occupant be thrown against the flexible container 9, this will be compressed resulting in an increasing in the pressure. In this state, the outlet valves open and gas is discharged. Should the occupant cease to compress the container 9, the pressure in the container 9 falls drastically. The supply flow of gas through the air inlet valve 15 allows the container 9 to be re-pressurized, thereby enabling it to return to an original expanded configuration/position. Where appropriate, the air inlet valve and/or the outlet valve are controlled by a control unit 17. The control unit 17 ensures that the working pressure and/or the outlet flow through the outlet valve 16 are adjusted according to the speed of the vehicle at the instant of collision and/or the weight of the occupant.

In the embodiment shown in FIG. 1, a driver's seat 18 is fitted in the driver's cab 4. On a rear-facing part thereof, the backrest 19 of the driver's seat has a shock-absorbing device 20. This shock-absorbing device 20 also comprises a flexible container 21 that is connected to a pressurized tank 22 by way of an inlet valve 23. On compression of the container 21, the discharge of air is permitted through outlet valves 24. This shock-absorbing device is used in order to afford protection to a passenger traveling behind the seat 18, and where appropriate, in a recumbent position on a bunk 25.

In the example of an embodiment shown, the pressurized tanks 14, 22 assigned to the shock-absorbing devices 8, 20 are fed from the vehicle compressed air system 26. This compressed air system comprises a compressor 27, which may be powered by the engine 28 of the vehicle, or where appropriate, it may consist of one or more of the cylinder chambers of the internal combustion engine, and which under particular operating conditions, is/are closed for normal operation and are instead used for supplying compressed air. The compressor 27 supplies one or more main tanks 30. A compressed air line 29 connects the main tank 30 to the pressurized tanks 14, 22 assigned to the shock-absorbing devices 8, 20. In an alternative embodiment, the main tank 30 may be coupled directly to the flexible container 9, 21. It is advantageous, however, to fit the pressurized tank assigned to the shock-absorbing device 8, 20 in close proximity to the flexible container 9, 21 since it is necessary to have the facility for rapid filling of the flexible container. For this purpose the pressurized tank 14, 22 is preferably connected to the flexible container 9, 21 by way of a pressure line 35, 36, the length of which is less than 0.8 m, preferably 0.4 m.

Figure 2:
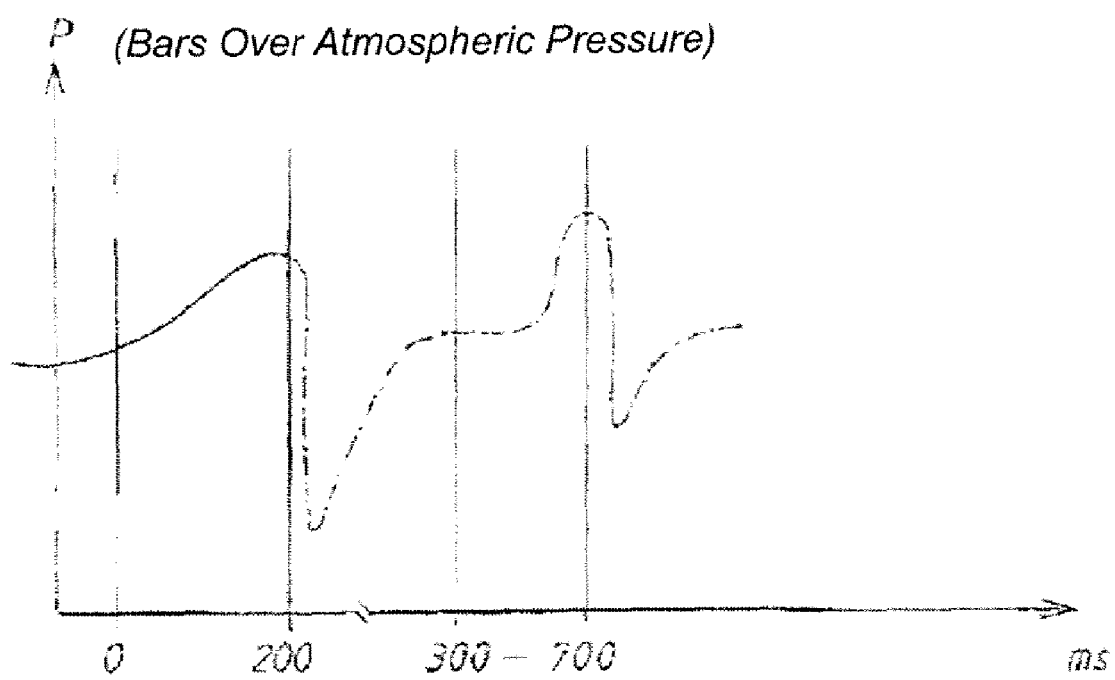
FIG. 2 is a graphical representation of pressure versus time demonstrating a crash sequence showing two impacts by an occupant.

FIG. 2 shows the pressure curve in a flexible container as a function of the time in a collision involving two impacts. At time t=0 an occupant strikes a flexible container. During an initial impact, the occupant compresses the flexible container for approximately 200 ms. During this time the pressure rises as a result of the compression of the container. When the occupant ceases to compress the container further, there is a dramatic drop in pressure. This occurs due to the fact that no further compression occurs and that the container rebounds as it seeks to recover its shape. Supplying gas enables the container to completely or partially recover its original shape. The shock-absorbing device is preferably designed to be resupplied with gas for a period of between 100 and 500 ms. FIG. 2 also shows a second impact that occurs after the gas-filled container has been refilled.

Figure 4:
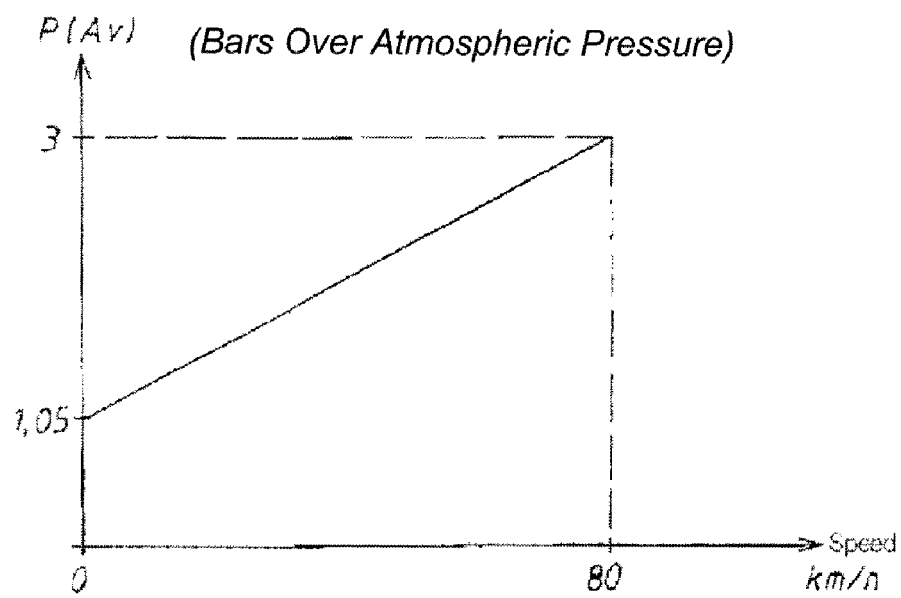
FIG. 4 is a graphical representation showing the variation in working pressure as a function of the speed of the vehicle.
Figure 5:
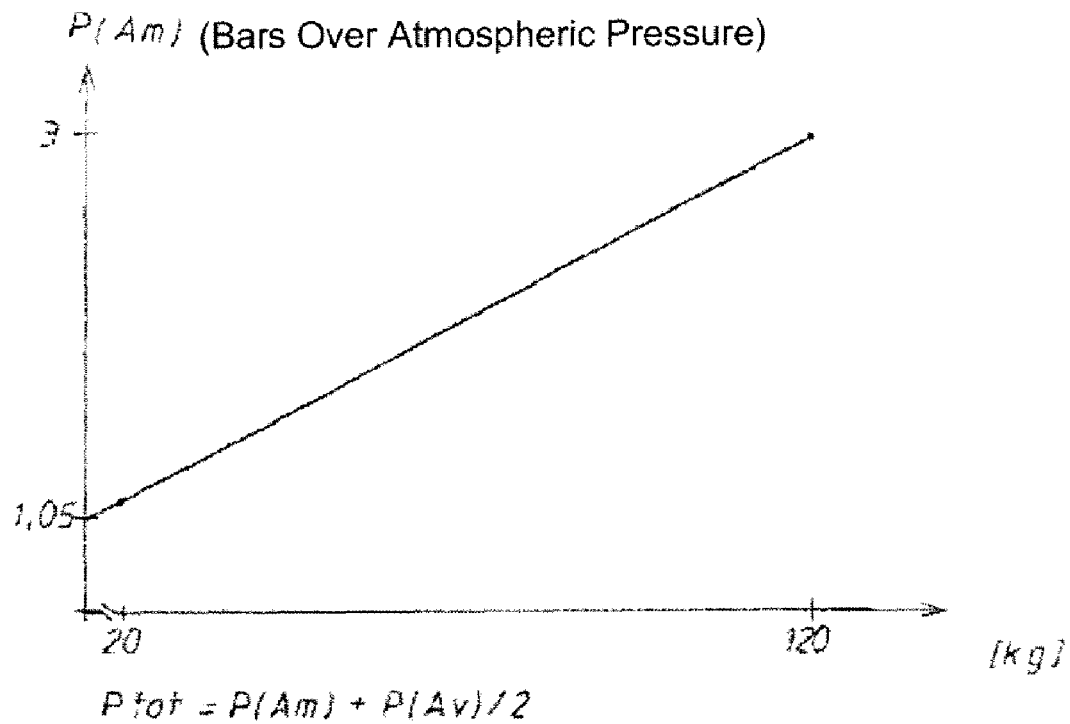
FIG. 5 is a graphical representation showing the variation in working pressure in relation to the weight of the occupant.

FIG. 4 shows a diagram of the variation in working pressure as a function of the speed of the vehicle. The working pressure increases as a function of the speed. According to the embodiment shown, the working pressure increases linearly as a function of the speed. FIG. 5 shows a diagram of the variation in working pressure in relation to the weight of the occupant. The working pressure increases as a function of the weight of the occupant. In a preferred embodiment in which the working pressure varies as a function of the speed and the weight of the occupant, the total working pressure Ptot can be set by the control unit to Ptot=(P(Av)+P(Am))/2, where P(Av) represents the working pressure as a function of the speed given by the diagram in FIG. 4 and P(Am) represents the working pressure as a function of the weight of the occupant given by the diagram in FIG. 5.

Figure 6:
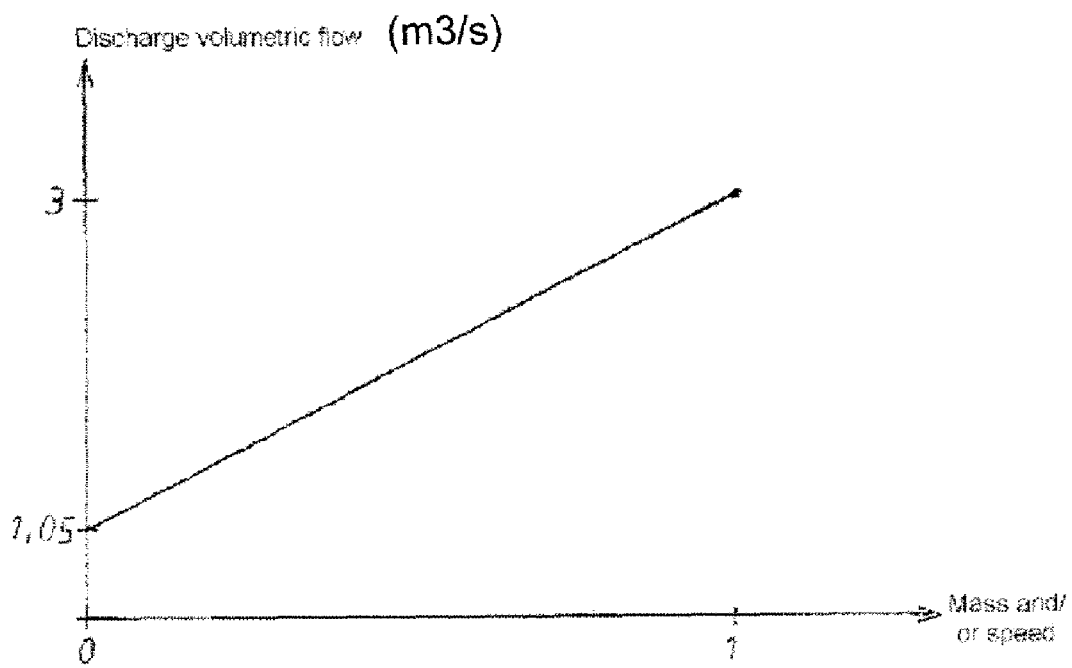
FIG. 6 is a graphical representation showing the permitted, normalized volumetric flow out through the air outlet valves as a function of the normalized mass of the occupant or the normalized speed of the vehicle.

FIG. 6 shows a diagram of the permitted, normalized volumetric flow out through the outlet air valves as a function of the normalized mass of the occupant or the normalized speed of the vehicle. The speed is preferably normalized for speeds of between 0 and 80 km/h and the mass of the occupant between 20 kg and 120 kg. The flow is normalized for a given speed, a variation of the discharge volumetric flow then being permitted around the normalized figure.

The invention is not limited to the embodiments specified above but may be freely modified within the scope of the patent claims.

What is claimed is:

1. A shock-absorbing occupant protection arrangement (8) for the passenger compartment of a vehicle (1), said shock-absorbing occupant protection arrangement (8) comprising:
   a flexible container (9) that is gas-filled when in an original expanded rest configuration and that is configured to be compressed when absorbing energy under impact by a passenger; and
   means (13) for returning the container (9) to the original expanded rest configuration following compression thereof, said means for returning comprising a control unit (17) configured 1) to regulate, via an air inlet valve (15), the working pressure of the flexible container (9) as a function of the amount of energy the container (9) potentially must absorb in the event of passenger impact; and (2) to repressurize the flexible container (9) following passenger impact with the container (9).

2. The shock-absorbing occupant protection arrangement as recited in claim 1, wherein said means (13) for returning further comprises a pressure tank (14) connected to said flexible container (9) by way of the air inlet valve (15), which pressure tank (14) delivers the working pressure for the flexible container (9).

3. The shock-absorbing occupant protection arrangement as recited in claim 2, wherein said flexible container (9) is formed with at least one outlet valve (16) configured to open at a higher pressure than the working pressure for the container (9).

4. The shock-absorbing occupant protection arrangement as recited in claim 3, wherein said control unit (17) is configured to regulate the pressure at which the at least one outlet valve (16) opens as a function of at least one of (i) the speed of the vehicle and (ii) the weight of the occupant.

5. The shock-absorbing occupant protection arrangement as recited in claim 1, wherein said control unit (17) is configured to regulate the working pressure in said flexible container (9) as a function of the speed of the vehicle.

6. The shock-absorbing occupant protection arrangement as recited in claim 1, wherein said control unit (17) is configured to regulate the working pressure in said flexible container (9) as a function of the weight of the occupant.

7. The shock-absorbing occupant protection arrangement as recited in claim 1, wherein the control unit (17) is configured to maintain the working pressure at between 1.05 and 3 bars over atmospheric pressure.

8. The shock-absorbing occupant protection arrangement as recited in claim 1, wherein the control unit (17) is configured to maintain the working pressure at between 1.6 and 2 bars over atmospheric pressure.

9. A vehicle (1), comprising:
   a pressure tank (14) coupled to a compressed air supply system (26), and
   a shock-absorbing occupant protection arrangement (8) for the passenger compartment of the vehicle (1), said shock-absorbing occupant protection arrangement (8) comprising
   a flexible container (9) that is gas-filled when in an original expanded rest configuration and that is configured to be compressed when absorbing energy under impact by a passenger; and
   means (13) for returning the container (9) to the original expanded rest configuration following compression thereof, said means for returning comprising a control unit (17) configured 1) to regulate, via an air inlet valve (15), the working pressure of the flexible container (9) as a function of the amount of energy the container (9) potentially must absorb in the event of passenger impact; and 2) to repressurize the flexible container (9) following passenger impact with the container (9).

10. The vehicle as recited in claim 9, wherein said means (13) for returning further comprises a pressure tank (14) connected to said flexible container (9) by way of the air inlet valve (15), which pressure tank (14) delivers the working pressure for the flexible container (9).

11. The vehicle as recited in claim 9, wherein said flexible container (9) is formed with at least one outlet valve (16) configured to open at a higher pressure than the working pressure for the container (9).

12. The vehicle as recited in claim 11, wherein said control unit (17) is configured to regulate the pressure at which the at least one outlet valve (16) opens as a function of at least one of (i) the speed of the vehicle and (ii) the weight of the occupant.

13. The vehicle as recited in claim 9, wherein said control unit (17) is configured to regulate the working pressure in said flexible container (9) as a function of the speed of the vehicle.

14. The vehicle as recited in claim 9, wherein said control unit (17) is configured to regulate the working pressure in said flexible container as a function of the weight of the occupant.

15. The vehicle as recited in claim 9, wherein the control unit (17) is configured to maintain the working pressure at between 1.05 and 3 bars over atmospheric pressure.

16. The vehicle as recited in claim 9, wherein the control unit (17) is configured to maintain the working pressure at between 1.6 and 2 bars over atmospheric pressure.

* * * * *